United States Patent
Seth et al.

[11] Patent Number: 5,866,222
[45] Date of Patent: Feb. 2, 1999

[54] SILICONE COPOLYMER MODIFIED RELEASE TAPES

[75] Inventors: Jayshree Seth; Stephen W. Bany; David J. Kinning, all of St. Paul, Minn.

[73] Assignee: Minnesota Mining and Manufacturing Co., St. Paul, Minn.

[21] Appl. No.: 896,708

[22] Filed: Jul. 18, 1997

[51] Int. Cl.⁶ ...................................... A61F 13/02
[52] U.S. Cl. .................. 428/41.4; 428/40.1; 442/87; 442/99
[58] Field of Search ................. 428/40.1, 41.4; 442/87, 99

[56] References Cited

U.S. PATENT DOCUMENTS

| | | | |
|---|---|---|---|
| 4,002,794 | 1/1977 | Schwarcz | 428/352 |
| 4,707,531 | 11/1987 | Shirahata | 528/12 |
| 4,728,571 | 3/1988 | Clemens et al. | 428/352 |
| 5,512,650 | 4/1996 | Leir et al. | 528/14 |

FOREIGN PATENT DOCUMENTS

WO 97/40103  10/1997  WIPO.

*Primary Examiner*—Helen L. Pezzuto
*Attorney, Agent, or Firm*—Gary L. Griswold; Robert W. Sprague; William J. Bond

[57] ABSTRACT

There is provided a block, segmented or graft copolymer having polyorganosiloxane segments and self-associating hard segments, which copolymer is capable of forming a solid, generally non-tacky release coating without the requirement of curing. The release coating comprises the polyorganosiloxane copolymer admixed with an MQ resin wherein the amount of MQ resin is generally between 1 and 30 weight percent of the polyorganosiloxane content preferably 1 to 20 weight percent. The MQ resin modifies the copolymer release material to have a higher release than the copolymer itself, generally at least 10 percent and preferable at least 20 percent up to 50 percent or higher with the readhesion values decreasing by 50 percent or less, preferably 40 percent or less.

48 Claims, No Drawings

SILICONE COPOLYMER MODIFIED RELEASE TAPES

BACKGROUND AND FIELD OF THE INVENTION

This invention relates to a thermoplastic release coating or tapes and films using this coating.

There are widely varying chemistries and techniques used to provide for release properties from a film or other web backing used in conjunction with a pressure-sensitive adhesive. Premium release materials have low release values with respect to conventional pressure-sensitive adhesives generally less than 25 to 50 grams/25 mm. These types of release values can be obtained using catalyst cured release systems based on polydialkylsiloxane. Modified release is often desired, for certain applications, which typically requires release values ranging from 100 to 500 grams/25 mm, and occasionally even higher. Slightly modified release values have been obtained with these cured systems by cross-linking silicone with non-silicone or modifiers and/or use of mixed silicones or the addition of MQ silicate resin as a release modifier (generally at levels of greater than 20 percent). For example, U.S. Pat. No. 5,292,787 discloses a thermally curable polyorganosiloxane using a controlled release additive of an epoxy-functional siloxane used in conjunction with a vinyl-functional siloxane using suitable cross-linkers and hydroxylation catalysts. In the examples, the addition of about 30 percent of the epoxy functional siloxane approximately doubled the release values (Examples 3 and 6) depending on the degree of branching of the epoxy functional siloxane.

However, there is a often a desire to avoid these curable systems, particularly where manufacturing flexibility is desired. Systems that require curing often present many difficult problems, for example the components are often hard to maintain in a stable form, the release coatings and components are often subject to wide manufacturing and performance variability, moisture or gel contamination and other problems. A proposed alternative to curable systems is the use of copolymers having polyalkylsiloxane segments or blocks and so called hard segments or blocks. In these systems, physical crosslinking occurs by self-association of the higher Tg hard segments or blocks. Segmented or block copolymers of this type are described, for example, in European Patent Application No. 250248, which proposes a release coating comprising a copolymer with at least poly-organosiloxane segment(s) and polyurea and/or polyurethane segment(s). These segmented copolymers are obtained by a condensation reaction of amine terminated difunctional polyorganosiloxane and diisocyanate, with optional chain extenders such as diamines and/or dialcohols, which can be soft segment materials. Using this type of segmented copolymer, release values for the release coating can be changed by varying the relative ratio and size of the hard and/or soft segments (e.g., for the polyorganosiloxane soft segments and any soft segment chain extenders). For example, this European patent indicates that the relative amount of hard segments in the copolymer can range from about 15 percent to about 70 percent to provide various levels of release performance. These segmented copolymer compositions can be solvent or hot melt coated. It is also disclosed that when blended with an MQ resin (at 50:50) certain of the copolymers (e.g. those having elastomeric properties) can form pressure-sensitive adhesives. Although these copolymers are desirable in many respects for use as release coatings, the modification of the release properties of these segmented copolymers is difficult, without changing the constituent monomers, oligomers or the like. Particularly in a manufacturing setting where there is a need for the ability to have a simple and easily adjustable method for modifying the release characteristics of a given release coating on line without changing the nature of the components used (e.g. with a segmented copolymer changing its constituent segments, monomers etc.).

U.S. Pat. No. 3,957,724 describes a release material formed from a polyorganosiloxane containing active hydrogens which are reacted with polyisocyanates prepolymerized with polyols or polyamines to form a chain extended prepolymer. The formed release material is not thermoplastic due to extensive crosslinking which system shares the disadvantages of the cured systems discussed above.

U.S. Pat. No. 4,002,794 describes an organopolysiloxane material having mercapto-terminal groups which are reacted with diisocyanates to form release materials. The material obtained is described as coatable from a solvent and does not require curing in order to form a solid release coating. Also, the siloxane release materials are described as being capable of being intermixed with other film forming materials including epoxy resins, polyesters, polyamides, polyacrylates, polyurethanes, polyvinylchloride and like film forming resins.

Elastomeric polyorganosiloxane/polyurethanes copolymers are disclosed in U.S. Pat. No. 4,518,758, which patent indicates that poor elastomeric properties were obtained in prior described methods for forming these types of block copolymers due to formation of heterogeneity in the medium when reacting a macrodiol containing a long polysiloxane chain and a short polyisocyanate or a short polyol.

Other patents dealing with polyorganosiloxane block or segmented copolymers used as a film or other uses include the following.

U.S. Pat. No. 5,045,391 describes the use of silicone-polyurea elastomers on an image release sheet used in electrographic processes.

U.S. Pat. No. 4,758,601 describes forming a cellular polyurethane polyorganosiloxane elastomer using an organic polyisocyanate, polyhydroxyl, water and a chain extending agent having two or more sites with active hydrogen capable of bonding with an isocyanate.

Japanese Patent Application No. 1-126,389 describes a release agent formed using an organopolysiloxane reactive with hard segment comprising polyurethane, polyurea, polyamide, or polyester material. This material is similar to that described in U.S. Pat. No. 3,957,724 mentioned above in that it requires on line curing or crosslinking due to the multi-functionality of the organopolysiloxane and the isocyanate, optionally with multifunctional chain extending agents.

Japanese Patent Application No. 89-183987 (abstract) discloses a polyorganosiloxane formed into a block copolymer with an isocyanate terminated polyurea, the material is described as a film former which is useful for "selective gas permeation membranes".

U.K. Patent No. 214044 B describes a block copolymer of a polyorganosiloxane intermixed with a generic hard segment material having a Tg of greater than 37° and a further soft segment of a polyethyleneoxide. The elastomeric material of this generic description allegedly has good biocompatibility and can be formed into films or other self-supporting materials for use in a biological setting.

U.S. Pat. No. 3,562,352 describes a polyorganosiloxane-polyurethane block copolymer formed by a condensation reaction between a vinylacetate group containing the polyorganosiloxane and a polyether or polyester urethane prepolymer.

U.S. Pat. No. 4,528,343 describes a copolymer of an organic polysiloxane with other non-silicone soft segments and polyurethane or polyurea hard segments to form an elastomeric material useful in conjunction with applications involving contact with blood. Similar biocompatible elastomers are described in U.S. Pat. No. 5,221,724 which reacts an aliphatic diisocyanate and an organic diisocyanate with an organopolysiloxane soft segment and a diol or diamine chain extender.

SUMMARY OF THE INVENTION

The present invention relates to a block, segmented or graft copolymer having polyorganosiloxane segments and self-associating hard segments, which copolymer is capable of forming a solid, generally non-tacky release coating without the requirement of curing. This copolymer can be extrudable as a thermoplastic material or coated out of solvent. The release coating comprises the polyorganosiloxane copolymer admixed with an MQ resin wherein the amount of MQ resin is generally between 1 and 30 weight percent of the polyorganosiloxane content preferably 1 to 20 weight percent. The MQ resin modifies the copolymer release material on a web backing. The release coated web material with the MQ resin has a higher release than the copolymer itself, generally at least 10 percent and preferable at least 20 percent up to 50 percent or higher with the readhesion values decreasing by 50 percent or less, preferably 40 percent or less.

DETAILED DESCRIPTION OF THE INVENTION

The invention release film or tape is formed by coating a web substrate on at least one face with a blend including at least an MQ resin and a copolymer formed to have hard and soft segments wherein at least a portion of the soft segments comprise polyorganosiloxane segments, the hard segment having a Tg of at least about 20° C., preferably at least 65° C.

The polyorganosiloxane copolymer segment(s) generally is a polyalkylsiloxane in which the alkyl groups contain from one to six carbon atoms, particularly preferred is methyl as the alkyl group. The polyalkylsiloxane used to form the copolymer is preferably substantially difunctional to obtain linear segmented or block copolymers, and monofunctional to obtain graft copolymers or certain block copolymers. The polyalkylsiloxane generally contains reactive group(s) such as those selected from vinyl, hydroxy, mercapto, amino, carboxy or the like. To form segmented type copolymers, difunctional polyorganosiloxane is reacted with a preferably essentially difunctional primary hard segment oligomer, monomer, or group such as a divinyl, diester, diisocyanate, diamine, dicarboxylic acid or the like. Monofunctional macromers can be used where block or graft copolymers are formed. Generally, nonfunctional polyalkylsiloxanes are undesirable but can be tolerated in relatively minor concentrations. Monofunctional polyalkylsiloxanes macromers are less desirable than terminally difunctional polyalkylsiloxanes in the formation of segmented copolymers, but can be used in forming block or graft copolymers.

Generally, the terms segmented copolymers and block copolymers are used interchangeably in this application in referring to polymers having the described polyorganosiloxane segments with suitable hard segments. However block copolymers generally refer to copolymers where the average nonsilicone segments are relatively higher molecular weight segment oligomers rather than lower molecular weight oligomers. The average molecular weight of the hard segments is not particularly limited. The hard segments need only be large enough to form a stable release coating that does not require the use of additional crosslinkers. Graft copolymers can be either segmented or block or both.

To form a graft copolymer, if the grafted segment is the polyalkylsiloxane, then the polyalkylsiloxane is preferably substantially monofunctional containing a reactive group such as those selected from vinyl, hydroxy, mercapto, amino, carboxy or the like, which is reacted with a backbone polymer or co-reacted with the backbone monomers. Alternatively a polyalkylsiloxane reactive oligomer can have one or more reactive groups and function as the backbone polymer with monofunctional grafted hard segment macromers or suitable coreacting monomers. Preferred graft copolymers include those described in U.S. Pat. Nos. 5,032,460; 5,154,962; and 4,728,571, the substances of which are incorporated herein by reference. Generally these patents describe forming organopolysiloxanes with polyvinyl groups formed by free radical polymerization. The polyvinyl groups or segments of the copolymer are formed in situ with the reactive organopolysiloxanes with free radically polymerizable vinyl monomers, with optional free radically polymerizable monomer or macromer modifiers such as polar monomers. Exemplary free radically polymerizable vinyl monomers would include styrene, vinyl acetate, vinyl chloride, acrylic or methacrylic esters of nontertiary alcohols or the like, which monomers are well known in the art. Suitable polar monomers, if used, include acrylic acid, methacrylic acid, itatonic acid, acrylamide, and other known polar monomers.

Generally, the polyorganosiloxane segments in the copolymer have a molecular weight of at least about one thousand, preferably at least 2 thousand to 20 thousand, most preferably at least four to ten thousand.

In a preferred embodiment, a copolymer is formed with a primary hard segment formed from a diisocyanate forming a polyurea or polyurethane in conjunction with a diamine or diol polyorganosiloxane oligomer with the functionality preferably at the terminal ends of substantially all the coreactive oligomers. Optional chain extending soft or hard segments can also be used, which also are preferably terminally difunctional.

For this preferred embodiment the primary hard segments preferably are formed from diisocyanates which can be represented by the formula:

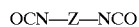

OCN—Z—NCO wherein Z is a polyvalent radical selected from arylene or alkylene radicals having from 6 to 20 carbon atoms, alkylene or cycloalkylene radicals having from 6 to 20 carbon atoms, and mixtures thereof. Examples of such diisocyanates include, but are not limited to aromatic diisocyanates, such as 2,6-toluene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl(o-dianisidine diisocyanate), 5-chloro-2,4-toluene diisocyanates, aromatic aliphatic diisocyanates such as m-xylylene diisocyanate, tetramethyl-m-xylylene diisocyanate, aliphatic diisocyanates, such as 1,4-diisocyanatobutane, 1,6-diisocyanatohexene, 2,2,4-trimethylhexyl diisocyanate, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate and mixtures thereof.

Preferred diisocyanates include 2,6-toluene diisocyanate, methylenediphenylene-4,4'-diisocyanate, polycarbodiimide-modified methylenediphenyl diisocyanate, o-dianisidine diisocyanate, tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, 1,6-diisocyanatohexane, and cyclohexylene-1,4-diisocyanate.

Tri or polyisocyanates can be present in relatively minor amounts provided that the release material is not crosslinked so that it can not be solvent coated or hot melt coated with the blended MQ resin.

Also for this preferred embodiment the polydiorganosiloxanes can be diamines, suitable diamines can be represented by the formula:

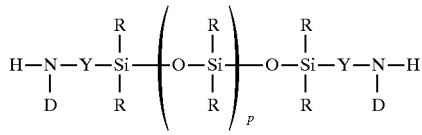

including those having number average molecular weights in the range of about 700 to 150,000.

D is individually selected from hydrogen, alkyl radicals having from 1 to 10 carbon atoms, phenyl radicals, or can form a ring structure with Y to form a heterocycle having from about 6 to 20 carbon atoms.

Y is individually selected from an alkylene radical having from 1 to 10 carbon atoms, an aralkyl radical or an aryl radical.

R is individually selected from substituted or unsubstituted radicals such as a monovalent alkyl or cycloalkyl radical having from 2 to 12 carbon atoms, a substituted alkyl radical having from 2 to 12 carbon atoms, a vinyl radical, a phenyl radical, a substituted phenyl radical, however at least 50 percent of the R radicals should be methyl.

p is generally 5 or more, preferably 10 or more, more preferably 15 to 2000 and most preferably 30 to 1500.

Preferred diamines are substantially pure polydiorganosiloxane diamines prepared as described in U.S. Pat. Nos. 5,214,119 or 5,512,650, wherein such description is incorporated herein by reference. High purity polydiorganosiloxane diamines can be prepared from the reaction of cyclic organosiloxanes and bis(aminoalkyl)disiloxanes utilizing an anhydrous amino alkyl functional silanolate catalyst such as tetramethylammonium 3-aminopropyldimethylsilanolate, preferably in an amount less than 0.15 weight percent based on the total weight of the cyclic organosiloxanes with the reaction run in two stages.

Particularly preferred are polydiorganosiloxane diamines prepared using cesium and rubidium catalysts.

Examples of polydiorganosiloxane diamines useful in the present invention include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, mixtures and copolymers thereof.

The MQ resins useful in the present invention include, for example, MQ silicate resins, MQD silicate resins, and MQT silicate resins which also may be referred to as copolymeric silicate resins and which preferably have a number average molecular weight of about 100 to about 50,000, more preferably about 500 to about 20,000 and generally have methyl substituents. The silicate resins include both non-functional and functional resins, the functional resins having one or more functionalities including, for example, silicon-bonded hydrogen, silicon-bonded alkenyl, and silanol. MQ silicate resins are copolymeric silicate resins having $R'_3SiO_{1/2}$ units and $SiO_{4/2}$ units. Such resins are described in, for example, Encyclopedia of Polymer Science and Engineering, vol. 15, John Wiley & Sons, New York, (1989), pp. 265 to 270, and U.S. Pat. Nos. 2,676,182; 3,627,851; 3,772,247; and 5,248,739 which are incorporated herein by reference. MQ silicate resins having functional groups are described in U.S. Pat. No. 4,774,310 which has silyl hydride groups, U.S. Pat. No. 5,262,558 which has vinyl and trifluoropropyl groups, and U.S. Pat. No. 4,707,531 which has silyl hydride and vinyl groups, each of which is incorporated herein by reference. The above described resins are generally prepared in solvent. Dried, or solventless, MQ silicate resins are prepared as described in U.S. Pat. Nos. 5,319,040; 5,302,685; and 4,935,484 each of which is incorporated herein by reference. MQD silicate resins are terpolymers having $R'_3SiO_{1/2}$ units, $SiO_{4/2}$ units, and $R'_2SiO_{2/2}$ units such as are taught in U.S. Pat. No. 5,110,890 which is incorporated herein by reference and Japanese Kokai HEI 2-36234.

Commercially available silicate resins include SR-545, MQ resin in toluene available from General Electric Co., Silicone Resins Division, Waterford, N.Y., MQOH resins which are MQ resins in toluene available from PCR, Inc., Gainesville, Fla., MQR-32-2, MQD resins in toluene available from Shin-Etsu Silicones of America, Inc., Torrance, Calif., and PC-403, hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying, steam separation, etc., to provide a silicate resin at 100 percent non-volatile content for use in compositions of the present invention. Also useful in compositions of the present invention are blends of two or more silicate resins.

Fillers, plasticizers and other property modifiers may be incorporated in the polyorganosiloxane copolymer release coatings of the present invention. Generally, such modifiers can be used in amounts ranging up to about 80 weight percent of the blend, including the MQ resin and the polyorganosiloxane copolymer, provided they do not adversely effect the overall release properties of the coating. Additives such as dyes, pigments, stabilizers, antioxidants, compatibilizers, and the like can also be incorporated into the MQ resin modified polyorganosiloxane copolymer release coatings of the invention. Generally, such additives are used in amounts ranging from 0 to about 20 weight percent of the blend as a whole.

Optional chain extending agents can be used as secondary non-silicone soft or hard segments or for other purposes. These materials are also preferably primarily difunctional when used to form copolymers as discussed above for the polyorganosiloxanes and have reactive groups the same or different than the polyorganosiloxane(s). Suitable chain extenders include divinyls, dihydroxyls, diamines, dicarboxyls, dimercapto groups and the like. Suitable chain extenders include short chain divinyls, diamines such as hexamethylene diamine, xylylene diamine, 1,3-di(4-piperidyl)propane (DIPIP), N(-2-aminoethyl propylmethyldimethoxysilane (DAS), piperazine 1,3-diaminopentane (DAMP), 1,4 diaminopentane, piperidyl propane or short chain diol such as 1,4-butanediol, ethylene glycol, diethylene glycol, dipropylene glycol, neopentyl glycol, 1-6-hexanediol, 1,4-cyclohexane dimethanol and the like.

Suitable longer chain non-silicone soft segments/chain extenders include polymeric diamines or diols such as polyethylene oxide diamine, polypropylene oxide diamine, polytetramethylene oxide diamine or diols such as polytetramethylene oxide glycol, polyethylene oxide glycol, polyethylene oxide glycol, polypropylene oxide glycol, polycaprolactone glycol, and the like.

Generally, the polyorganosiloxane copolymers are comprised of from 2 to 95 weight percent hard segment and 98 to 5 weight percent polyorganosiloxane. With optional chain extending agents comprising from 0 to 80 weight percent of the copolymer. The hard segment is preferably from 2 to 90 weight percent, most preferably 5 to 60 weight percent of the copolymer, most preferably and from 15 to 50 weight percent for certain uses. Correspondingly the polyorganosiloxane preferably comprises 10 to 98 weight percent, most preferably 40 to 95 weight percent of the copolymer. Generally although suitable for release modification in accordance with the teachings of the invention if the copolymer has relatively (e.g. more than 60 percent hard segment) large amounts of hard segment the hard segment content raises the release value of the copolymer such that there is sometimes not the need for additional release modification by the use of an MQ resin.

The base web can comprise any suitable substrate including woven, nonwoven, knitted or like fibrous webs, thermoplastic films, or laminates thereof. The web can be release coated with the invention release coating by solvent or hot melt coating as is known in the art.

A pressure-sensitive adhesive can be provided on the opposite face of the web backing and can be any adhesive which will releasably adhere to the polyorganosiloxane release coating. Suitable adhesives include tackified elastomer based adhesives, particularly those based on A-B type block copolymers (e.g. a block copolymer containing at least one A block and at least one B block) where the A blocks are polyarenes such as polystyrenes, and the like and the B blocks are polydienes such as polyisoprene, polybutadiene, hydrogenated versions thereof, copolymers and the like. These A and B blocks can be arranged in any suitable relation as linear, branched, tapered, star or radial blocks and can be tackified with solid and/or liquid tackifiers as is known in the art.

Initial and Aged Release and Readhesion Test Methods

This test measures the effectiveness of the release composition initially and after a period of aging at room temperature or at an elevated temperature. The initial or aged release value is a quantitative measure of the force required to remove a flexible adhesive tape from a substrate coated with the test composition at a specific angle and rate of removal. In the following examples this force is expressed in Newtons per decimeter (N/dm) from the following representative examples of flexible adhesive tapes: Tape A—a tackified styrene-isoprene block copolymer pressure-sensitive adhesive coated on a polypropylene backing. The adhesive composition of the test tape was 52 weight percent Kraton™ 4433 (a polystyrene-polyisoprene linear block copolymer available from Shell Chemical Co. having approximately 15 percent diblock and 85 percent triblock, and a styrene content of about 22 percent), 47 weight percent Wingtack™ Plus (a solid $C_5$ tackifying resin available from Goodyear Chemical Co.), and 1 weight percent Shellflex™ 371 (a naphthenic oil available from Shell Chemical Co.). The adhesive was hot-melt coated onto a 4.6 mil (116 micron) polypropylene film backing (the polypropylene resin used to extrude the backing was #5A95 available from Union Carbide). The adhesive coating thickness was approximately 42 microns; and Tape B—an aggressive acrylate copolymer pressure-sensitive adhesive on a polypropylene backing available as Tape No. 845 from 3M Co.

Coatings of MQ resin modified polyorganosiloxane-polyureas were prepared by solvent coating from 5% solutions onto a 40 micron thick flame treated biaxially oriented polypropylene substrate using a #6 Mayer rod. The coatings were dried at 70° C. for 10 minutes, yielding a dried coating thickness of approximately 0.3 microns.

After allowing the dried coatings to condition at room temperature and 50% relative humidity for 24 hours, initial and aged release testing was conducted by rolling down 2.54 cm by 20 cm strips of a pressure-sensitive adhesive (PSA) coated test tape onto the release coatings with a 2 kg rubber roller. The PSA tape/release coated film composite was allowed to age for the desired time/temperature conditions and was then adhered to a glass plate in an Instrumentors, Inc. slip/peel tester (model 3M90) with double coated tape. The force required to peel the test tape at a peel rate of 30 cm/minute at a 180° peel angle was then measured after allowing the test tape to dwell in contact with the coated substrate initially (i.e., 30 seconds dwell) and for one week at room temperature (21° C.) and 49° C. (120° F.).

Aged readhesions were also measured by adhering the freshly peeled tape to a clean glass plate and measuring the peel adhesion in normal fashion using the same Instrumentors slip/peel tester indicated above, again peeling at 30 cm/min and at a 180° peel angle. A 2 kg roller was used to roll down the tape onto the glass plate, and the readhesion was measured immediately without further dwell time. These measurements were taken to determine whether a drop in the adhesion value occurred due to undesirable contamination of the adhesive surface by the release coating. Readhesions are reported as a percentage of the force required to remove the aged sample from a clean glass plate versus the force required to remove a control tape sample from a clean glass plate which has not been adhered to the release coating.

90° Release Force

The release force test was used to measure the amount of force that was required to peel a sample of a pressure-sensitive adhesive test tape from the release coated surface of the release tape.

The release tape sample to be tested was securely adhered (release coated side up) to a steel panel measuring two inches×five inches (5.1 cm×12.7 cm) using a double-coated adhesive tape. A one inch (2.5 cm) wide strip of the adhesive test Tape A was then adhered to the surface of the release tape sample and the test tape was then rolled down with two passes of a 4.5 lb (2 kilogram) rubber roller. The panel was placed into a fixture that was then placed into the bottom jaw of an Instron™ constant rate tensile tester while the adhesive test tape was held by the upper jaw. The upper jaw was set in motion at a constant crosshead speed of 12 inches (30.5 cm) per minute while the steel panel was moved so as to keep the adhesive test tape at a 90 degree angle to the panel. The tests were carried out at a constant temperature of 21° C. and 50 percent relative humidity. The force required to remove the adhesive test tape from the release tape was recorded as the release force. The release force results are reported in Newtons/decimeter (N/dm). The results represent an average of 2–4 independent measurements.

90° Readhesion from Polyethylene

The readhesion test was carried out in order to get an indication if any silicone or silicate resin had transferred from the release coated side of the release tape to the adhesive coated side of the release tape after the tape had been wound up in roll form. The test involves measuring the 90 degree peel adhesion from a smooth polyethylene surface for the release tape after the tape had been wound up in roll form. A decrease in peel adhesion is an indication that some degree of silicone or silicate resin transfer has occurred.

A 13 mil (330 micron) piece of smooth polyethylene film was securely adhered to a steel panel measuring two inches× five inches (5.1 cm×12.7 cm) using double-coated adhesive tape. A one inch (2.5 cm) wide strip of the release tape was adhered to the surface of the polyethylene film and the release tape was rolled down with two passes of a 100 gram rubber roller. The panel was placed into a fixture that was then placed into the bottom jaw of an Instron™ constant rate tensile tester while the release tape was held by the upper jaw. The upper jaw was set in motion at a constant crosshead speed of 12 inches (30.5 cm) per minute while the steel panel was moved so as to keep the release tape at a 90 degree angle to the panel. The tests were carried out at a constant temperature of 21° C. and 50 percent relative humidity. The force required to remove the release tape from the polyethylene film was recorded as the readhesion value. The readhesion results are reported in Newtons/decimeter (N/dm). The results represent an average of 2–4 independent measurements.

EXAMPLES 1 THROUGH 8

Examples 1 through 8 were prepared to examine how the addition of increasing amounts of MQ resin to a polyorganosiloxane-polyurea segmented copolymer affects the release characteristics of the segmented copolymer.

A 15% solids solution of a polyorganosiloxane-polyurea segmented copolymer in a 50:50 isopropyl alcohol:toluene solvent mixture was prepared in the following manner by the condensation reaction of a polyorganosiloxane diamine, a diamine chain extender, an oligomeric non-silicone soft segment diamine and a diisocyanate as described in U.S. Pat. Nos. 5,214,119, 5,290,615, and 5,461,134: 22.5 grams of a polydimethylsiloxane diamine (PDMS) having a number average molecular weight of 5325 that had been prepared using a cesium hydroxide catalyst according to the method of U.S. Pat. No. 5,512,650 was degassed with warming under vacuum, then purged with nitrogen in a screw capped jar. To this polyorganosiloxane diamine was added 31.5 grams Jeffamine™ D400 (a polyoxypropylene diamine having a molecular weight of approximately 450 available from the Huntsman Corp.), 6.7 grams Dytek™ A (2-methyl-1,5-pentanediamine available from DuPont), and 510 grams of a 50:50 mixture of isopropyl alcohol:toluene. This solution was stirred well, then 29.3 grams of isophorone diisocyanate were added dropwise to the solution. This reactive solution was stirred for approximately 1 hour. The resulting segmented copolymer had a 25/35/40 PDMS/soft segment/hard segment content.

The following day, coatable samples were prepared by further diluting the solution with sufficient isopropyl alcohol:toluene mixture (50:50) to yield a 5% solids polyorganosiloxane-polyurea solution. To this solution, 0, 5, 10, 15, 20, 30, 40, 50 or 100% MQ resin SR-545 (a MQ silicate resin in toluene available from General Electric Co.) was added. In these and all other examples, "% MQ" means the amount of MQ resin based on polyorganosiloxane content of the segmented or graft copolymer. For example, for 10 grams of the above prepared polyorganosiloxane-polyurea segmented copolymer containing 25 percent by weight polyorganosiloxane, the 10% MQ release coating composition of Example 2 is formed by adding 0.25 gram of MQ resin. The MQ resin modified organopolysiloxane-polyurea solutions were then coated onto a 40 micron thick flame treated biaxially oriented polypropylene substrate using a No. 6 Mayer rod. The coated samples were dried at 70° C. for 10 minutes, yielding a dried coating thickness of approximately 0.3 microns.

The samples were tested as described above for initial release and aged release and readhesion after seven days of aging at both 21° C. and 49° C. using Tape A. The results are given in Table I.

TABLE I

| Example | % MQ | Initial Release (N/dm) | Aged Release (7 days, 21° C.) (N/dm) | Aged Release (7 days, 49° C.) (N/dm) | Aged Readhesion (7 days, 21° C.) (%) | Aged Readhesion (7 days, 49° C.) (%) |
|---|---|---|---|---|---|---|
| Control 1 | 0 | 4.0 s | 8.0 s | 11.0 s | 92 | 97 |
| 1 | 5 | 6.5 s | 14.0 s | 23.3 s | 82 | 90 |
| 2 | 10 | 11.3 s | 16.5 s | 22.3 s/sh | 77 | 84 |
| 3 | 15 | 13.4 s | 24.5 s | 22.5 s/sh | 73 | 90 |
| 4 | 20 | 14.5 s | 24.6 s | 23.0 sh | 70 | 89 |
| 5 | 30 | 10.6 sh | 9.0 sh | 9.2 sh | 85 | 97 |
| 6 | 40 | 10.4 sh | 10.1 sh | 8.4 sh | 88 | 100 |
| 7 | 50 | 5.5 sh | 7.1 sh | 7.4 sh | 91 | 95 |
| 8 | 100 | 9.6 sh | 6.8 sh | 6.9 sh | 89 | 99 | s = smooth peel,
sh = shocky peel

These data show that, for this particular polyorganosiloxane-polyurea segmented copolymer, the release force increased as the amount of MQ resin was increased, up to 20% MQ loading. At higher MQ contents, the peels became shocky and the release force decreased. In the case of smooth peels, the readhesion levels decreased as the amount of MQ resin added to the segmented copolymer was increased.

EXAMPLES 9 THROUGH 13

Examples 9 through 13 were prepared to examine how the release properties of a polyorganosiloxane-polyurea segmented copolymer having a high PDMS content are affected by the addition of increasing amounts of MQ resin to the segmented copolymer.

The examples were prepared as described for Examples 1 through 8 except that the polyorganosiloxane-polyurea segmented copolymer was prepared by chain extending a polydimethylsiloxane diamine, having a number average molecular weight of 5350, with a stoichiometric amount of tetramethyl-m-xylylene diisocyanate. This segmented copolymer contains 95.6 wt % siloxane. In addition, the 50:50 isopropyl alcohol:toluene solvent mixture used for polymerizing and coating the release samples of Examples 1–8 was replaced with 100% isopropyl alcohol. No chain extenders or non-silicone soft segments were used in this base segmented copolymer formulation. MQ resin (SR-545) was added to the polyorganosiloxane-polyurea segmented copolymer in the amounts of 0, 10, 20, 30, 40, 50% MQ and release samples were prepared and tested for initial release and aged release and readhesion as described above using Tape B. The segmented copolymer having no MQ resin added was also examined as a control. The results are given in Table II.

EXAMPLES 14 THROUGH 19

Examples 14 through 19 were prepared to examine how the release properties of a chain extended ployorganosiloxane-polyurea segmented copolymer having a high hard segment content (80 wt %) are affected by the addition of increasing amounts of MQ resin to the segmented copolymer.

The examples were prepared as described for Examples 1 through 8, except that the 15% solids polyorganosiloxane-polyurea segmented copolymer solution comprised 4.50 grams (20 weight percent) polydimethylsiloxane diamine (PDMS) having a number average molecular weight of 5325, 80 weight percent hard segment derived from 8.66 grams dipiperidylpropane and 9.34 grams isophorone diisocyanate, and 127.50 grams 50:50 isopropyl alcohol-:toluene solvent mixture. No oligomeric non-silicone soft segment diamines were used in this base segmented copolymer formulation. MQ resin (SR-545) was added to the polyorganosiloxane-polyurea segmented copolymer in the amounts of 0, 5, 10, 15, 20, 25, and 50% MQ and release samples were prepared and tested for initial release and aged release and readhesion as described above using Tape A. The segmented copolymer having no MQ resin added was also examined as a control. The results are given in Table III.

TABLE II

| Example | % MQ | Initial Release (N/dm) | Aged Release (7 days, 21° C.) (N/dm) | Aged Release (7 days, 49° C.) (N/dm) | Aged Readhesion (7 days, 21° C.) (%) | Aged Readhesion (7 days, 49° C.) (%) |
|---|---|---|---|---|---|---|
| Control 2 | 0 | 0.9 s | 1.2 s | 2.1 s | 97 | 88 |
| 9 | 10 | 1.2 s | 2.6 s | 4.4 s | 99 | 84 |
| 10 | 20 | 3.3 s | 7.3 s | 14.3 s | 95 | 91 |
| 11 | 30 | 8.8 s | 16.4 s | 19.9 s | 82 | 84 |
| 12 | 40 | 13.2 s | 19.9 s | 21.0 s | 72 | 80 |
| 13 | 50 | 8.4 s | 12.2 s | 26.5 s | 78 | — |

These data show that the addition of increasing amounts of MQ resin to a polyorganosiloxane-polyurea segmented copolymer having a higher PDMS content (95.6 wt. %) had a similar effect on the release characteristics as the addition of MQ resin to an polyorganosiloxane-polyurea segmented copolymer having a lower PDMS content (25 percent), i.e., an increase in release force with the addition of MQ resin, accompanied by a decrease in the readhesion level, when the peels are smooth.

TABLE III

| Example | % MQ | PDMS Content (wt %) | Initial Release (N/dm) | Aged Release (7days, 21° C.) (N/dm) | Aged Release (7 days, 49° C.) (N/dm) | Aged Readhesion (7 days, 21° C.) (%) | Aged Readhesion (7 days, 49° C.) (%) |
|---|---|---|---|---|---|---|---|
| Control 3 | 0 | 20 | 1.9 s | 13.1 s | 23.9 s | 84 | 84 |
| 14 | 5 | 20 | 2.4 s | 16.0 s | 26.1 s | 84 | 85 |
| 15 | 10 | 20 | 3.9 s | 19.5 s | 24.1 s | 75 | 83 |
| 16 | 15 | 20 | 6.8 s | 25.2 s | 31.7 s | 78 | 95 |
| 17 | 20 | 20 | 7.8 s | 27.9 s | 30.0 s | 69 | 92 |
| 18 | 25 | 20 | 9.7 s | 25.3 s | 34.2 s | 66 | 79 |
| 19 | 50 | 20 | 17.7 s | 32.8 s | 41.9 s | 63 | 85 |

In general, the release forces increase with increasing amounts of MQ resin. In addition, the 25° C. aged readhesions decrease with increasing MQ content. In contrast, the heat aged readhesions were similar at all MQ loadings.

EXAMPLES 20 THROUGH 37

To examine any effect of the molecular weight of the polyorganosiloxane segment of the polyorganosiloxane-polyurea segmented copolymers, segmented copolymers (25/35/40 PDMS/soft segment/hard segment) having polydimethylsiloxane diamine (PDMS) segments with molecular weights (Mn) ranging from 1000 to 100000 were prepared as described above for Examples 1–8. MQ resin (SR-545) was added to the segmented copolymers in the amounts of 0, 15, 30, and 100% MQ. Release samples were prepared as described above and were evaluated for their release characteristics using Tape A. Segmented copolymers without any added MQ resin were also evaluated as controls. Results are given in Table IV.

polyorganosiloxane-polyurea segmented copolymers resulted in an increase in release force accompanied by a decrease in the readhesion levels.

EXAMPLES 38 THROUGH 45

Examples 38 through 45 were prepared to examine the effects of the addition of different types of MQ resins to polyorganosiloxane-polyurea segmented copolymers. MQ resins W-803, 31-1, 31-2, and 31-3 were added to an polyorganosiloxane-polyurea segmented copolymer like that prepared for Examples 1 through 8 (25/35/40 PDMS/soft segment/hard segment; 5000 Mn PDMS segment). The MQ resins were added in the amount of 15 and 30 weight percent based on the PDMS content of the segmented copolymer. Release samples were prepared as described above and samples were evaluated for release and readhesion characteristics using Tape A. A sample of the segmented copolymer without any added MQ resin was also evaluated as a control. Results are given in Table V.

TABLE IV

| Example | % MQ | PDMS Diamine (wt %) | Initial Release (N/dm) | Aged Release (7days, 21° C.) (N/dm) | Aged Release (7 days, 49° C.) (N/dm) | Aged Readhesion (7 days, 21° C.) (%) | Aged Readhesion (7 days, 49° C.) (%) |
|---|---|---|---|---|---|---|---|
| Control 5 | 0 | 1000 | 4.3 sh | 6.2 sh | 4.6 sh | 94 | 100 |
| 20 | 15 | 1000 | 7.0 sh | 9.4 sh | 9.0 sh | 8i | 92 |
| 21 | 30 | 1000 | 4.5 sh | 9.9 sh | 9.2 sh | 74 | 85 |
| 22 | 100 | 1000 | 3.2 sh | 16.6 sh | 11.0 sh | 66 | 66 |
| Control 6 | 0 | 5,000 | 4.0 s | 8.0 s | 11.0 s | 92 | 97 |
| 23 | 15 | 5,000 | 13.4 s | 24.5 s | 22.5 s/sh | 73 | 90 |
| 24 | 30 | 5,000 | 10.6 sh | 9.0 sh | 9.2 sh | 85 | 97 |
| 25 | 100 | 5,000 | 9.6 sh | 6.8 sh | 6.9 sh | 89 | 99 |
| Control 7 | 0 | 10,000 | 1.2 s | 4.9 s | 6.0 s | 92 | 101 |
| 26 | 15 | 10,000 | 1.7 s | 5.7 s | 6.8 s | 94 | 105 |
| 27 | 30 | 10,000 | 4.6 s | 9.5 s | 11.9 s | 92 | 97 |
| 28 | 100 | 10,000 | 11.4 sh | 25.8 sh | 33.7 sh | 72 | 92 |
| Control | 0 | 20,000 | 0.8 s | 2.9 s | 3.6 s | 94 | 110 |
| 29 | 15 | 20,000 | 0.8 s | 2.5 s | 3.4 s | 95 | 111 |
| 30 | 30 | 20,000 | 0.8 s | 2.7 s | 3.6 s | 97 | 103 |
| 31 | 100 | 20,000 | 10.2 s | 10.5 s | 14.0 s | 84 | 92 |
| Control 9 | 0 | 35,000 | 0.8 s | 2.8 s | 3.2 s | 97 | 108 |
| 32 | 15 | 35,000 | 0.9 s | 3.2 s | 3.2 s | 98 | 110 |
| 33 | 30 | 35,000 | 0.9 s | 2.7 s | 3.2 s | 106 | 111 |
| 34 | 100 | 35,000 | 0.8 s | 10.7 s | 10.7 s | 83 | 91 |
| Control 10 | 0 | 100,000 | 0.2 s | 0.7 s | 0.8 s | 64 | 81 |
| 35 | 15 | 100,000 | 0.4 s | 0.7 s | 1.4 s | 77 | 91 |
| 36 | 30 | 100,000 | 1.0 s | 5.3 s | 9.4 s | 105 | 111 |
| 37 | 100 | 100,000 | 18.3 s | 25.5 s | 36.1 s | 83 | 91 |

In general, for PDMS segment molecular weights less than 20,000, the addition of MQ resin to these

TABLE V

| Example | % MQ | MQ Resin | Initial Release (N/dm) | Aged Release (7 days, 21° C.) (N/dm) | Aged Release (7 days, 49° C.) (N/dm) | Aged Re-adhesion (7 days, 21° C.) (%) | Aged Re-adhesion (7 days, 49° C.) (%) |
|---|---|---|---|---|---|---|---|
| Control 11 | 0 | 0 | 4.0 s | 8.0 s | 11.0 s | 92 | 97 |
| 38 | 15 | W-803[1] | 14.9 s | 9.2 sh | 13.5 sh | 91 | 101 |

TABLE V-continued

| Example | % MQ | MQ Resin | Initial Release (N/dm) | Aged Release (7 days, 21° C.) (N/dm) | Aged Release (7 days, 49° C.) (N/dm) | Aged Readhesion (7 days, 21° C.) (%) | Aged Readhesion (7 days, 49° C.) (%) |
|---|---|---|---|---|---|---|---|
| 39 | 30 | W-803[1] | 4.9 sh | 8.1 sh | 8.0 sh | 89 | 99 |
| 40 | 15 | 31-1[2] | 13.6 sh | 14.1 sh | 11.6 sh | 85 | 97 |
| 41 | 30 | 31-1[2] | 14.2 sh | 9.7 sh | 12.0 sh | 90 | 99 |
| 42 | 15 | 31-2[2] | 17.5 s | 24.9 sh | 29.2 sh | 79 | 87 |
| 43 | 30 | 31-2[2] | 9.0 sh | 15.8 sh | 22.1 sh | 86 | 89 |
| 44 | 15 | 31-3[2] | 17.2 s | 29.3 s | 31.8 s | 71 | 78 |
| 45 | 30 | 31-3[2] | 18.1 s | 30.2 s | 13.7 sh | 82 | 100 |

[1]W-803 is a vinyl functional MQ silicate resin available from Wacker Chemie.
[2]Resins 31-1, 31-2, and 31-3 are MQD silicate resins respectively having approximately 2, 5, and 8 weight percent D structural units, and are available from Shin-Etsu Chemical Co.

In the case of W-803 MQ resin, only a slight increase in the aged release force was obtained at 15% resin loading. For the 31-1, 31-2, and 31-3 resins, more significant increases in the peel forces are seen upon addition of the MQ resin. In general, the higher peel forces are accompanied by lower readhesion levels.

EXAMPLES 46 THROUGH 48

A vinyl-silicone graft copolymer was prepared via the free radical polymerization of methyl acrylate (MA), vinyl acetate (VOAc), and methacrylic acid (MAA) in the presence of a mercaptofunctional silicone chain transfer agent (X-22-980 available from Shin-Etsu Chemical Co.). The ratio of the components was 30:30:10:30 MA/VOAc/MAA/X-22-980. The copolymer was prepared in methylethylketone (MEK) according to a method similar to that described in Example 1 of U.S. Pat. No. 5,032,460. The graft copolymer was then further diluted with MEK to give a 5 percent solids solution. MQ resin SR-545 was added to the copolymer in the amounts of 6.7, 13.3, and 26.7 weight percent based on the silicone content of the vinyl-silicone graft copolymer. The solutions were then gravure coated using a Pattern No. 120 roll (Pyramid cell type) onto a 3 mil (76 micron) polypropylene film backing (the polypropylene resin used to extrude the backing was #3576 available from Fina). The vinyl-silicone graft copolymer having no MQ resin added to it was also coated for evaluation as a control. The coated samples were conditioned for at least 24 hours at 21° C. and 50% relative humidity, then evaluated for release force using test Tape A according to the "90° Release Force" test method described above. The results of these release force tests are given in Table VI.

For readhesion testing, sample tape rolls were prepared by hot melt coating the tackified styrene-isoprene block copolymer pressure-sensitive adhesive composition comprising 50 weight percent Kraton™ 1119 (a polystyrene-polyisoprene linear block copolymer available from Shell Chemical Co. having approximately 65 percent diblock and 35 percent triblock content, and a styrene content of about 22 percent) and 50 weight percent Wingtack™ Plus (a solid $C_5$ tackifying resin available from Goodyear Chemical Co.) onto the opposite side of the release coated polypropylene film backing. The adhesive coating thickness was 25 microns. Sample tapes were then wound up in roll form, conditioned for at least 24 hours at 21° C. and 50% relative humidity, and tested for readhesion according to the "90° Readhesion from Polyethylene" test method described above. The results of these readhesion tests are also given in Table VI.

TABLE VI

| Example | Percent MQ | Release force (N/dm) | Readhesion (N/dm) |
|---|---|---|---|
| Control 12 | 0 | 13.2 | 35.8 |
| 46 | 6.7 | 16.6 | 21.4 |
| 47 | 13.3 | 17.6 | 16.2 |
| 48 | 26.7 | 19.9 | 14.9 |

As observed in previous examples, an increase in release force was observed with the addition of MQ resin, accompanied by a decrease in the readhesion levels.

I claim:

1. A release coated backing material comprising a backing web having a first face and a second face, at least the first face having a substantially tack free release coating of a blend of a MQ resin and a thermoplastic copolymer having polyorganosiloxane segments and hard segments having a Tg of at least 20° C. wherein the amount of MQ resin is between 1 and 30 weight percent of the polyorganosiloxane content.

2. The release coated backing material of claim 1 wherein the amount of MQ resin is between 1 and 20 weight percent of the polyorganosiloxane content.

3. The release coated backing material of claim 1 wherein the hard segments have a Tg of at least about 65° C.

4. The release coated backing material of claim 1 wherein the polyorganosiloxane is a polyalkylsiloxane.

5. The release coated backing material of claim 4 wherein the polyalkylsiloxane alkyl groups contain one to six carbon atoms.

6. The release coated backing material of claim 5 wherein the alkyl groups are predominately methyl.

7. The release coated backing material of claim 4 wherein the polyorganosiloxane copolymer is a segmented copolymer.

8. The release coated backing material of claim 4 wherein the polyorganosiloxane segments have a molecular weight of at least about 1000.

9. The release coated backing material of claim 4 wherein the polyorganosiloxane segments have a molecular weight of from 2000 to 20000.

10. The release coated backing material of claim 4 wherein the polyorganosiloxane segments have a molecular weight of from 4000 to 10000.

11. The release coated backing material of claim 1 wherein the hard segments comprise an isocyanate reaction product.

12. The release coated backing material of claim 1 wherein the MQ resin comprises MQ silicate resins, MQD silicate resins, MQT silicate resins or combinations thereof.

13. The release coated backing material of claim 12 wherein the MQ resin has a number average molecular weight from about 100 to 50,000.

14. The release coated backing material of claim 1 wherein the backing web comprises a woven, nonwoven, knitted, film or laminate thereof.

15. The release coated backing material of claim 1 further comprising a pressure-sensitive adhesive on the second face.

16. The release coated backing material of claim 1 wherein a polyorganosiloxane used to form the copolymer is preferably substantially difunctional or monofunctional to obtain segmented or graft copolymers.

17. The release coated backing material of claim 1 wherein the polyorganosiloxane contains reactive group(s) selected from vinyl, hydroxy, mercapto, thio, amino, carboxy or the like, which is reacted with primary hard segment group selected from a vinyl, ester, isocyanate, amine, carboxylic acid or the like.

18. The release coated backing material of claim 17 wherein the polyorganosiloxane is a polyalkylsiloxane and the hard segment groups are substantially difunctional.

19. The release coated backing material of claim 1 wherein the polyorganosiloxane copolymer is a graft copolymer.

20. The release coated backing material of claim 19 wherein the polyorganosiloxane is the graft segment formed from substantially monofunctional macromers.

21. The release coated backing material of claim 19 wherein the polyorganosiloxane is the backbone segment having one or more reactive groups.

22. The release coated backing material of claim 1 wherein the copolymer has polyvinyl hard segments formed by free radical polymerization.

23. The release coated backing material of claim 22 wherein the polyvinyl hard segments are formed by in situ reaction of reactive polyorganosiloxane with free radically polymerizable vinyl monomers, with optional free radically polymerizable monomer or macromer modifiers such as polar monomers.

24. The release coated backing material of claim 23 wherein the free radically polymerizable vinyl monomers comprise styrene, vinyl acetate, vinyl chloride, acrylic or methacrylic esters of nontertiary alcohols or combinations thereof.

25. The release coated backing material of claim 7 wherein the segmented copolymer is comprising a primary hard segment formed from a diisocyanate used to forming a polyurea or polyurethane in conjunction with a terminally functional diamine or diol polyorganosiloxane with optional chain extending soft or hard segments.

26. The release coated backing material of claim 25 wherein the diisocyanates comprises 2,6-toluene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl(o-dianisidine diisocyanate), 5-chloro-2,4-toluene diisocyanates, m-xylylene diisocyanate, tetramethyl-m-xylylene diisocyanate 1,4-diisocyanatobutane, 1,6-diisocyanatohexene, 2,2,4-trimethylhexyl diisocyanate, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate and mixtures thereof.

27. The release coated backing material of claim 26 wherein the primary hard segments are formed from diisocyanates which can be represented by the formula:

OCN—Z—NCO wherein Z is a polyvalent radical selected from arylene or alkylene radicals having from 6 to 20 carbon atoms, alkylene or cycloalkylene radicals having from 6 to 20 carbon atoms, and mixtures thereof.

28. The release coated backing material of claim 25 wherein the diisocyanates comprises 2,6-toluene diisocyanate, methylenediphenylene-4,4'-diisocyanate, polycarbodiimide-modified methylenediphenyl diisocyanate, o-dianisidine diisocyanate, tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, 1,6-diisocyanatohexane, and cyclohexylene-1,4-diisocyanate and mixtures thereof.

29. The release coated backing material of claim 1 where the release coating is hot melt coated.

30. The release coated backing material of claim 16 wherein the polyorganosiloxane is a diamine represented by the formula:

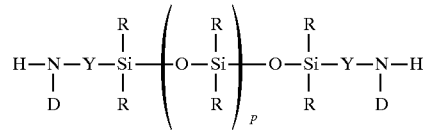

including those having number average molecular weights in the range of about 700 to 150,000, D is individually selected from hydrogen, alkyl radicals having from 1 to 10 carbon atoms, phenyl radicals, or can form a ring structure with Y to form a heterocycle having from about 6 to 20 carbon atoms, Y is individually selected from an alkylene radical having from 1 to 10 carbon atoms, an aralkyl radical or an aryl radical, R is individually selected from substituted or unsubstituted radicals such as a monovalent alkyl or cycloalkyl radical having from 2 to 12 carbon atoms, a substituted alkyl radical having from 2 to 12 carbon atoms, a vinyl radical, a phenyl radical, a substituted phenyl radical, however at least 50 percent of the R radicals should be methyl, p is 5 or more.

31. The release coated backing material of claim 30 wherein the polydialkylsiloxane is substantially pure polydialkylsiloxane diamine.

32. The release coated backing material of claim 30 wherein the polydialkylsiloxane diamine comprises polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, mixtures and copolymers thereof.

33. The release coated backing material of claim 1 wherein the MQ resin has a number average molecular weight of about 100 to about 50,000.

34. The release coated backing material of claim 1 wherein the MQ resin has a number average molecular weight of about 500 to about 20,000 with primarily methyl substituents.

35. The release coated backing material of claim 1 wherein the release coating comprises a blend further comprising fillers, plasticizers and other property modifiers in amounts ranging from 0 to about 80 weight percent of the blend which modifiers do not adversely effect the overall release properties of the release coating.

36. The release coated backing material of claim 1 wherein the copolymer further comprises non-silicone soft segments.

37. The release coated backing material of claim 36 wherein the non-silicone soft segments are primarily difunctional.

38. The release coated backing material of claim 16 wherein the copolymers further comprises chain extenders comprising short chain divinyls, diamines such as hexamethylene diamine, xylylene diamine, 1,3-di(4-piperidyl) propane (DIPIP), N(-2-aminoethyl propylmethyldimethoxysilane (DAS), piperazine 1,3-diaminopentane (DAMP), 1,4 diaminopentane, piperidyl propane or short chain diols such as 1,4-butanediol, ethylene glycol, diethylene glycol, dipropylene glycol, neopentyl glycol, 1–6-hexanediol, 1,4-cylcohexane dimethanol and the like.

39. The release coated backing material of claim 38 wherein the non-silicone soft segments are chain extenders comprising polymeric diamines or diols such as polyethylene oxide diamine, polypropylene oxide diamine, polytetramethylene oxide diamine or diols such as polytetramethylene oxide glycol, polyethylene oxide glycol, polyethylene oxide glycol, polypropylene oxide glycol, polycaprolactone glycol, and the like.

40. The release coated backing material of claim 1 wherein the polyorganosiloxane copolymers are comprised of 2 to 90 weight percent hard segment and 98 to 10 weight percent polyorganosiloxane, with chain extending agents comprising from 0 to 80 weight percent of the copolymer.

41. The release coated backing material of claim 40 wherein the hard segment comprises from 2 to 90 weight percent of the copolymer.

42. The release coated backing material of claim 40 wherein the hard segment comprises from 5 to 60 weight percent of the polyorganosiloxane copolymer.

43. The release coated backing material of claim 40 wherein the hard segment comprises 15 to 50 weight percent of the copolymer.

44. The release coated backing material of claim 15 wherein the pressure-sensitive adhesive provided on the second face of the web backing comprises a tackified elastomer based adhesive.

45. The release coated backing material of claim 15 wherein the pressure-sensitive adhesive provided on the second face of the web backing comprises a A-B type block copolymer elastomer where the A blocks are predominately polyarenes and the B blocks are predominately polydienes tackified with solid and/or liquid tackifiers.

46. The release coated backing material of claim 1 wherein the release coating's release value with MQ resin is at least 10 percent higher than without the MQ resin.

47. The release coated backing material of claim 1 wherein the release coating's release value with MQ resin is at least 20 percent higher than without the MQ resin.

48. The release coated backing material of claim 1 wherein the release coating's release value with MQ resin is at least 50 percent higher than without the MQ resin.

* * * * *